(12) United States Patent
Kim et al.

(10) Patent No.: US 9,272,696 B2
(45) Date of Patent: Mar. 1, 2016

(54) FAILURE DIAGNOSIS METHOD FOR BRAKE SYSTEM OF VEHICLE

(71) Applicants: Hyundai Motor Company, Seoul (KR); Research & Business Foundation SungKyunKwan University, Suwon-si (KR)

(72) Inventors: In Su Kim, Anyang-si (KR); Jong Yun Jeong, Hwaseong-si (KR); Dong Yoon Hyun, Hwaseong-si (KR); Ji Weon Ko, Suwon-si (KR); Hyun Soo Kim, Seoul (KR)

(73) Assignees: Hyundai Motor Company, Suwon-si (KR); Research & Business Foundation SungKyunKwan University, Seoul (KR)

( * ) Notice: Subject to any disclaimer, the term of this patent is extended or adjusted under 35 U.S.C. 154(b) by 15 days.

(21) Appl. No.: 14/103,242

(22) Filed: Dec. 11, 2013

(65) Prior Publication Data
US 2014/0324283 A1 Oct. 30, 2014

(30) Foreign Application Priority Data
Apr. 30, 2013 (KR) .................. 10-2013-0047981

(51) Int. Cl.
| | |
|---|---|
| *B60T 17/22* | (2006.01) |
| *B60W 50/04* | (2006.01) |
| *B60L 3/00* | (2006.01) |
| *B60T 8/88* | (2006.01) |
| *B60T 13/66* | (2006.01) |

(Continued)

(52) U.S. Cl.
CPC ............. *B60T 17/221* (2013.01); *B60L 3/0076* (2013.01); *B60T 1/10* (2013.01); *B60T 8/885* (2013.01); *B60T 13/662* (2013.01); *B60T 17/22* (2013.01); *B60W 20/50* (2013.01); *B60W 50/04* (2013.01); *B60T 2270/402* (2013.01); *B60T 2270/413* (2013.01); *B60T 2270/604* (2013.01)

(58) Field of Classification Search
None
See application file for complete search history.

(56) References Cited

U.S. PATENT DOCUMENTS

| | | | |
|---|---|---|---|
| 5,775,784 A | 7/1998 | Koga et al. | |
| 7,416,039 B1 * | 8/2008 | Anderson et al. | 180/165 |
| 2002/0036429 A1 * | 3/2002 | Shimada et al. | 303/152 |

(Continued)

FOREIGN PATENT DOCUMENTS

| | | |
|---|---|---|
| JP | 08-163707 | 6/1996 |
| JP | 8-164837 A | 6/1996 |

(Continued)

*Primary Examiner* — Rami Khatib
*Assistant Examiner* — Jeffrey Boomer
(74) *Attorney, Agent, or Firm* — Morgan, Lewis & Bockius LLP

(57) ABSTRACT

A failure diagnosis method for a brake system of a vehicle determines whether the failure occurs in a regenerative braking device, a front-wheel friction braking device or a rear-wheel friction braking device. The method may include comparing a driver's required acceleration/deceleration with a current acceleration/deceleration of the vehicle, determining that a failure has occurred in the brake system of the vehicle when the driver's required acceleration/deceleration is different from the current acceleration/deceleration of the vehicle and comparing a driver's required braking torque with a regenerative braking maximum torque, and determining that the failure does not occur in the brake system of the vehicle when the driver's required acceleration/deceleration is substantially equal to the current acceleration/deceleration of the vehicle.

6 Claims, 11 Drawing Sheets

(51) Int. Cl.
 *B60W 20/00* (2006.01)
 *B60T 1/10* (2006.01)

(56) References Cited

U.S. PATENT DOCUMENTS

| | | | |
|---|---|---|---|
| 2004/0108771 A1* | 6/2004 | Tsunehara | 303/155 |
| 2005/0218718 A1* | 10/2005 | Iwatsuki | B60T 8/1766 303/177 |
| 2006/0220453 A1* | 10/2006 | Saito et al. | 303/152 |
| 2007/0018499 A1* | 1/2007 | Kokubo et al. | 303/151 |
| 2007/0247001 A1* | 10/2007 | Nakano | 303/157 |
| 2008/0173490 A1* | 7/2008 | Itoh | 180/165 |
| 2008/0265662 A1* | 10/2008 | Karnjate et al. | 303/3 |
| 2011/0303497 A1* | 12/2011 | Gaffney et al. | 188/106 P |
| 2012/0118683 A1* | 5/2012 | Desbois-Renaudin et al. | 188/158 |
| 2013/0014499 A1* | 1/2013 | Gray, Jr. | 60/327 |
| 2013/0041565 A1* | 2/2013 | Fujiki et al. | 701/70 |
| 2013/0162009 A1* | 6/2013 | Mitts et al. | 303/3 |
| 2013/0345913 A1* | 12/2013 | Krueger | B60T 1/10 701/22 |
| 2014/0163833 A1* | 6/2014 | Kim | 701/70 |

FOREIGN PATENT DOCUMENTS

| | | |
|---|---|---|
| JP | 2006-27545 A | 2/2006 |
| JP | 2006-205912 | 8/2006 |
| JP | 2011-202736 | 10/2011 |
| KR | 10-0820489 B1 | 4/2008 |

* cited by examiner

FAILURE DIAGNOSIS METHOD FOR BRAKE SYSTEM OF VEHICLE

CROSS-REFERENCE TO RELATED APPLICATION

The present application claims priority of Korean Patent Application Number 10-2013-0047981 filed Apr. 30, 2013, the entire contents of which application are incorporated herein for all purposes by this reference.

BACKGROUND OF INVENTION

1. Field of Invention

The present invention relates to a failure diagnosis method for a brake system of a vehicle driven using an electric motor. More particularly, the present invention relates to a failure diagnosis method for a brake system of a vehicle, in which, when a failure occurs in the brake system of the vehicle, it is decided whether the failure occurs in any one of a regenerative braking device, a front-wheel friction braking device and a rear-wheel friction braking device, which constitute the brake system.

2. Description of Related Art

As known in the art, a green vehicle such as a hybrid vehicle or electric vehicle driven by an electric motor performs regenerative braking to improve fuel efficiency when a driver stops the vehicle.

In general, a regenerative braking system of the green vehicle converts kinetic energy of the vehicle into electric energy, stores the converted electric energy in a battery, and enables the electric energy stored in the battery to be reused while driving an electric motor, thereby improving the fuel efficiency of the vehicle.

The vehicle performs regenerative braking cooperation control which allows the sum of a regenerative braking torque generated in an electric motor (driving motor) and a friction braking torque generated in a brake during regenerative braking to be equal to a driver's required braking torque.

However, the braking force generated in the vehicle when a failure occurs in a regenerative braking device or friction braking device (i.e., the braking force of the vehicle) does not satisfy the driver's required braking force (does not generate a braking force corresponding to the driver's required braking force). Therefore, the driver feels different when the braking of the vehicle is performed, and the braking distance of the vehicle is increased.

In order to prevent such a situation, a device for detecting a failure of each braking device and compensating for a braking force of the device in which the failure occurs is mounted in the braking device of the vehicle.

Conventionally, there was used a failsafe control method of a braking device, which can satisfy a driver's required braking force by determining a failure of a corresponding braking device, using a signal transmitted from the braking device when a failure occurs in the braking device built in a vehicle, and compensating for a braking force of the braking device in which the failure occurs.

However, in a case where the failure decision signal of the braking device is not used in the conventional fail safe control method, the compensation for the braking force of the braking device in which the failure occurs is not performed, and therefore, a braking force corresponding to the driver's required braking force is not generated.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention provides a failure diagnosis method for a brake system of a vehicle, in which it is decided whether a failure occurs in any one of braking devices by analyzing a change in acceleration/deceleration value detected through an acceleration/deceleration sensor built in the vehicle, so that it is possible to compensate for a deficient braking force, using normally operated braking devices.

In various aspects, the present invention provides a failure diagnosis method for a brake system of a vehicle, including: comparing a driver's required acceleration/deceleration with a current acceleration/deceleration of the vehicle; determining that a failure has occurred in the brake system of the vehicle when the driver's required acceleration/deceleration is different from the current acceleration/deceleration of the vehicle, and comparing a driver's required braking torque with a regenerative braking maximum torque; and determining that the failure does not occur in the brake system of the vehicle, when the driver's required acceleration/deceleration is substantially equal to the current acceleration/deceleration of the vehicle.

In one aspect, the failure diagnosis method may include comparing a front-wheel required braking torque with a regenerative braking maximum torque, when the driver's required braking torque is no less than the regenerative braking maximum torque; comparing vehicle braking acceleration/deceleration with a decrement of braking acceleration/deceleration, when the front-wheel required braking torque is less than the regenerative braking maximum torque; and determining that the failure has occurred in a rear-wheel friction braking device, when the vehicle braking acceleration/deceleration is no less than the decrement of braking acceleration/deceleration, and determining that the failure has occurred in a regenerative braking device, when the vehicle acceleration/deceleration is less than the decrement of braking acceleration/deceleration.

In another aspect, when the driver's required braking torque is less than the regenerative braking maximum torque, it may be decided that the failure has occurred in a regenerative braking device.

In still another aspect, the failure diagnosis method may include comparing a front-wheel braking torque with a regenerative braking maximum torque, when the driver's required braking torque is no less than the regenerative braking maximum torque; comparing a motor rotational speed with a motor base speed, when the front-wheel required braking torque is no less than the regenerative braking maximum torque; calculating an acceleration/deceleration differential value by differentiating an absolute value of a current acceleration/deceleration of the vehicle, when the motor rotational speed is no less than the motor base speed; and determining whether the failure occurs in a regenerative braking device, a front-wheel friction braking device or a rear-wheel friction braking device.

In yet another aspect, when the acceleration/deceleration differential value is substantially equal to 0, it may be decided that the failure has occurred in the rear-wheel friction braking device. When the acceleration/deceleration differential value is smaller than 0, it may be decided that the failure has occurred in the regenerative braking device. When the acceleration/deceleration differential value is greater than 0, it may be decided that the failure has occurred in the front-wheel friction braking device.

In still yet another aspect, the failure diagnosis method may include comparing a front-wheel required braking torque with a regenerative braking maximum torque, when the driver's required braking torque is no less than the regenerative braking maximum torque; comparing a motor rotational speed with a motor base speed, when the front-wheel required braking torque is no less than the regenerative braking maximum torque; and determining whether the failure occurs in a regenerative braking device, a front-wheel friction braking device or a rear-wheel friction braking device, based on a result obtained by comparing decreased acceleration/deceleration of the vehicle with acceleration/deceleration generated only by regenerative braking, when the motor rotational speed is less than the motor base speed.

In a further aspect, the failure diagnosis method may include comparing a required regenerative braking force with a required front-wheel friction braking force, when the decreased acceleration/deceleration of the vehicle is substantially equal to the acceleration/deceleration generated only by the regenerative braking; and determining that the failure has occurred in the regenerative braking device, when the required regenerative braking force is different from the required front-wheel friction braking force.

In another further aspect, the failure diagnosis method may include comparing a required regenerative braking force with a required front-wheel friction braking force, when the decreased acceleration/deceleration of the vehicle is substantially equal to the acceleration/deceleration generated only by regenerative braking; determining whether a change in acceleration/deceleration of the vehicle is generated in response to a change in braking force of the front-wheel friction braking device, when the required regenerative braking force is substantially equal to the required front-wheel friction braking force; and determining that the failure has occurred in the regenerative braking device, when the change in acceleration/deceleration of the vehicle is generated, and determining that the failure has occurred in the front-wheel friction braking device, when the change in acceleration/deceleration of the vehicle is not generated.

In still another further aspect, the failure diagnosis method may include determining whether a change in acceleration/deceleration of the vehicle is generated in response to a change in braking force of the front-wheel friction braking device, when the decreased acceleration/deceleration of the vehicle is different from the acceleration/deceleration generated only by regenerative braking; and determining that the failure has occurred in the rear-wheel friction braking device, when the change in acceleration/deceleration of the vehicle is generated, and determining that the failure has occurred in the front-wheel friction braking device, when the change in acceleration/deceleration of the vehicle is not generated.

Other aspects and exemplary embodiments of the invention are discussed infra.

In the failure diagnosis method for the brake system of the vehicle according to the present invention, when a failure occurs in the brake system, it is decided whether the failure occurs in any one of the regenerative braking device, the front-wheel friction braking device and the rear-wheel friction braking device, which constitute the brake system, so that it is possible to compensate for a deficient braking force, using normal braking devices.

Further, it is decided whether a failure occurs in any one of the braking devices by analyzing a change in acceleration/deceleration detected through the acceleration/deceleration sensor built in the vehicle, so that it is possible to provide against a case where it is impossible to use a failure decision signal of the conventional braking device.

Further, after it is precisely decided whether a failure occurs in any one of the braking devices, it is possible to compensate for the braking force of the braking device in which the failure occurs. Accordingly, it is possible to stably generate a braking force corresponding to the driver's required braking force. In addition, it is possible to prevent driver's different feeling and increase in braking distance of the vehicle, which occur in a failure of the conventional braking device.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
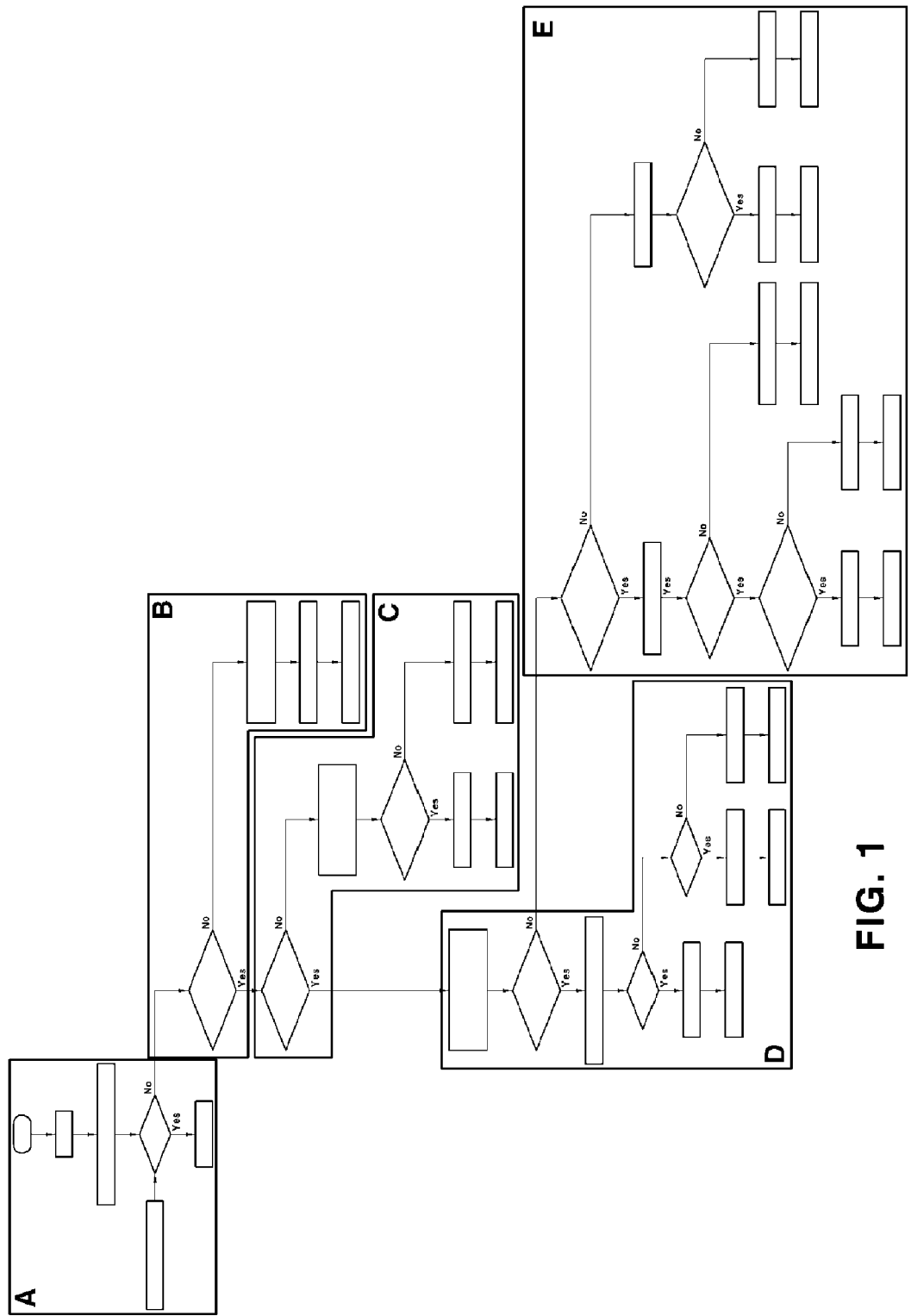
FIG. 1 is a flowchart illustrating a failure diagnosis method for a brake system of a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention provides a failure diagnosis method for a brake system of a vehicle. Particularly, in the failure diagnosis method, it is possible to decide a failure of a braking device, using an acceleration/deceleration sensor built in the vehicle, so as to provide against a case where it is impossible to use a failure decision signal of the braking device.

The failure diagnosis method for the brake system according to the present invention may be applied to a vehicle which performs regenerative braking on front wheels of the vehicle and uses a brake by wire system as a friction braking device. For example, the failure diagnosis method may be applied to a vehicle which uses an electronic wedge brake (EWB) as a front-wheel friction braking device and uses an electronic mechanical brake (EMB) as a rear-wheel friction braking device.

Figure 2:
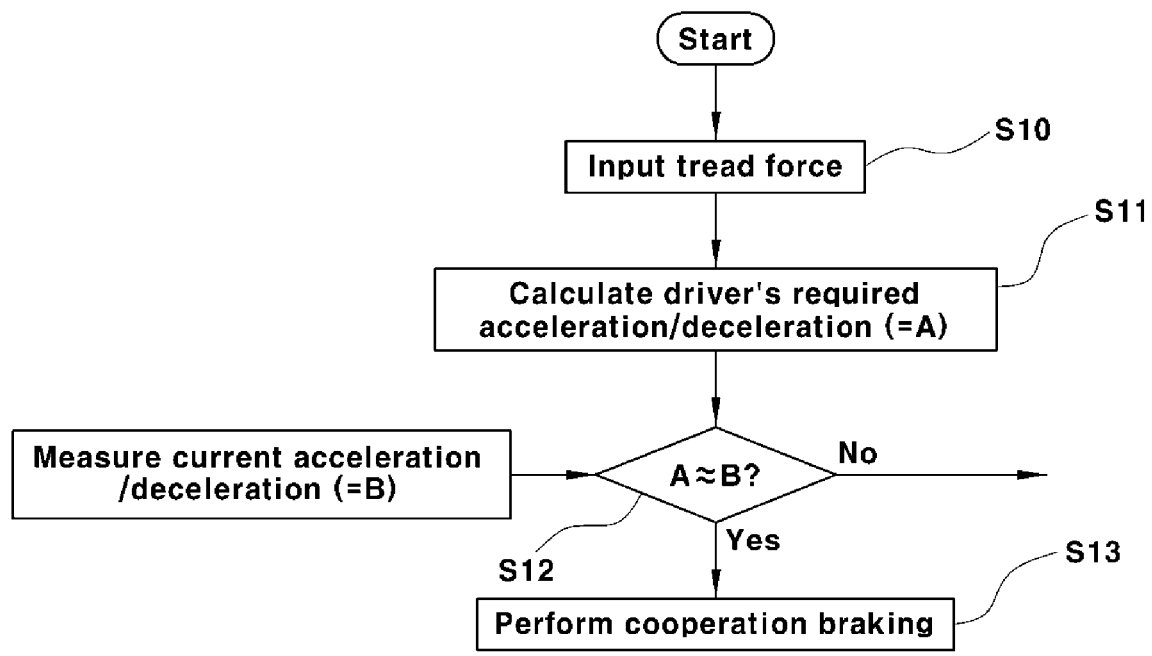
FIG. 2 is a partial flowchart showing 'A' of FIG. 1.

FIG. 1 is a flowchart illustrating a failure diagnosis method for a brake system of a vehicle according to various embodiments of the present invention (the detailed explanations are provided in FIGS. 2, 3, 5, 7 and 10). FIG. 2 is a partial flowchart showing 'A' of FIG. 1.

As shown in 'A' of FIG. 1 and FIG. 2, in the failure diagnosis method according to the embodiments of the present invention, if a driver's required braking force is input to a brake control unit (BCU) by pushing a brake pedal (S10), the BCU calculates a driver's required acceleration/deceleration value, based on the driver's required braking force (S11) and then compares the calculated acceleration/deceleration value with a current acceleration/deceleration sensor value of the vehicle (S12), thereby determining whether a failure occurs in the brake system.

The BCU decides whether a failure occurs in the brake system by comparing a driver's required acceleration/deceleration value calculated using a signal input from a pedal stroke sensor when a driver pushes the brake pedal with a current acceleration/deceleration sensor value input from an acceleration/deceleration sensor of the vehicle (S12).

Here, the driver's required acceleration/deceleration value refers to an acceleration/deceleration value corresponding to the driver's required braking force. The acceleration/deceleration value is required according to a force (e.g., tread force) with which the driver pushes the brake pedal or a displacement of the brake pedal.

In a case where the driver's required acceleration/deceleration value is equal to the current acceleration/deceleration value, the BCU performs regenerative braking cooperation control (S13). In a case where the driver's required acceleration/deceleration value is different from the current acceleration/deceleration value, the BCU decides that a failure has occurred in the brake system.

For example, if the current acceleration/deceleration sensor value (i.e., a real-time measurement value of the acceleration/deceleration sensor built in the vehicle) is smaller than that driver's required acceleration/deceleration value, the BCU decides that a failure has occurred in the brake system.

In the regenerative braking cooperation control, the braking of the vehicle is performed by appropriately distributing a regenerative braking force and a friction braking force.

The BCU determining that the failure has occurred in the brake system of the vehicle detects whether the braking of the vehicle is performed with only regenerative braking, whether the braking of the vehicle is performed with the regenerative braking and rear-wheel friction braking or whether the braking of the vehicle is performed with the regenerative braking, front-wheel friction braking and the rear-wheel friction braking.

In a case where the braking of the vehicle is performed with the regenerative braking, the front-wheel friction braking and the rear-wheel friction braking, the BCU detects whether a speed of a driving motor is no less than a base speed (e.g., base rpm) or whether the speed of the driving motor is less than the base speed.

The BCU, which detects with which braking the braking of the vehicle is performed, detects whether the failure occurs in any one of a regenerative braking device, a front-wheel friction braking device and a rear-wheel friction braking device, which constitute the brake system of the vehicle, using acceleration/deceleration as a base for determining that the failure has occurred in the brake system.

Figure 3:
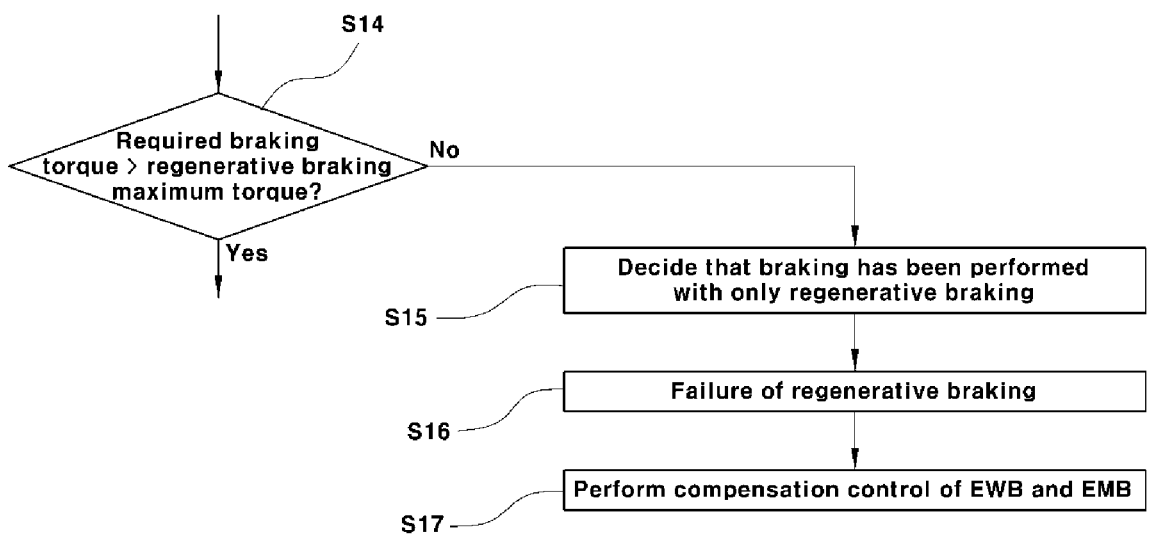
FIG. 3 is a partial flowchart showing 'B' of FIG. 1.

In a case where the failure occurs in the brake system because the driver's required acceleration/deceleration value is not equal to the current acceleration/deceleration value, the BCU compares a driver's required braking torque (or driver's required braking force) with a regenerative braking maximum torque (or regenerative braking maximum value) as shown in FIG. 3 (S14).

In a case where the driver's required braking torque is less than the regenerative braking maximum torque as the compared result, the BCU decides that the braking of the vehicle is performed with only the regenerative braking (S15), and decides that the failure has occurred in the regenerative braking device (S16).

Figure 4:
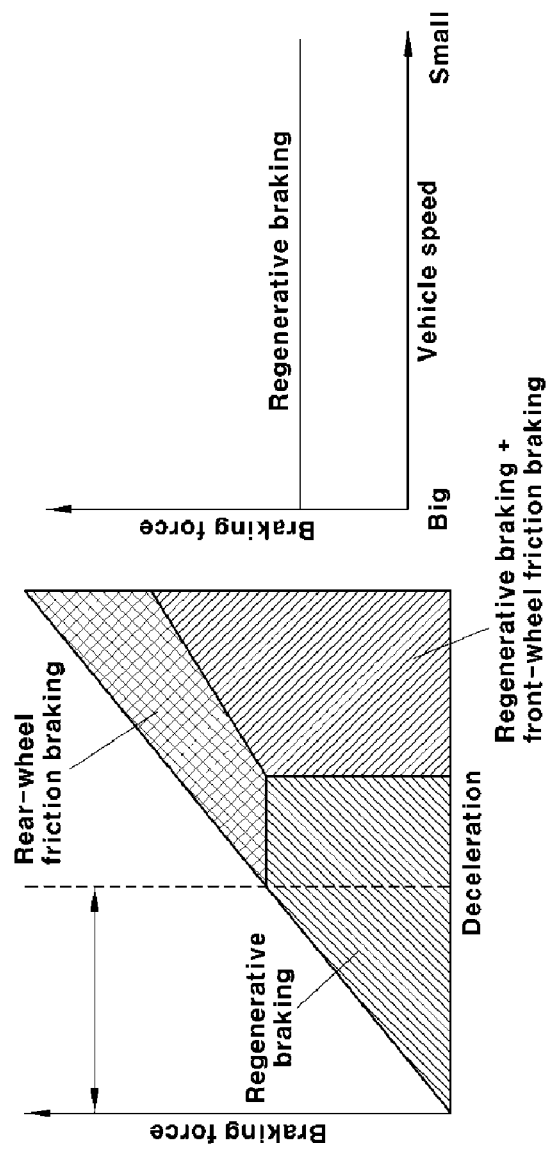
FIG. 4 shows in the left graph a combination of various braking forces constituting the vehicle braking force in regenerative braking cooperation control according to deceleration, and in the right graph a braking force formed when braking is performed with only regenerative braking according to vehicle speed.

In a case where the driver's required braking torque is smaller than the regenerative braking maximum torque in the regenerative braking cooperation control of the vehicle, the braking of the vehicle is performed with only the regenerative braking as shown in FIG. 4.

Thus, in a case where the driver's required braking torque is less than the regenerative braking maximum torque when a failure occurs in the brake system, the braking of the vehicle is performed with only the regenerative braking. Accordingly, the BCU can decide that the failure has occurred in the regenerative braking device.

In a case where the failure occurs in the regenerative braking device as described above, a deficient braking force caused by the failure of the regenerative braking device is compensated using the front-wheel friction braking device and the rear-wheel friction braking device (S17), thereby providing a desired braking force of the vehicle.

Figure 5:
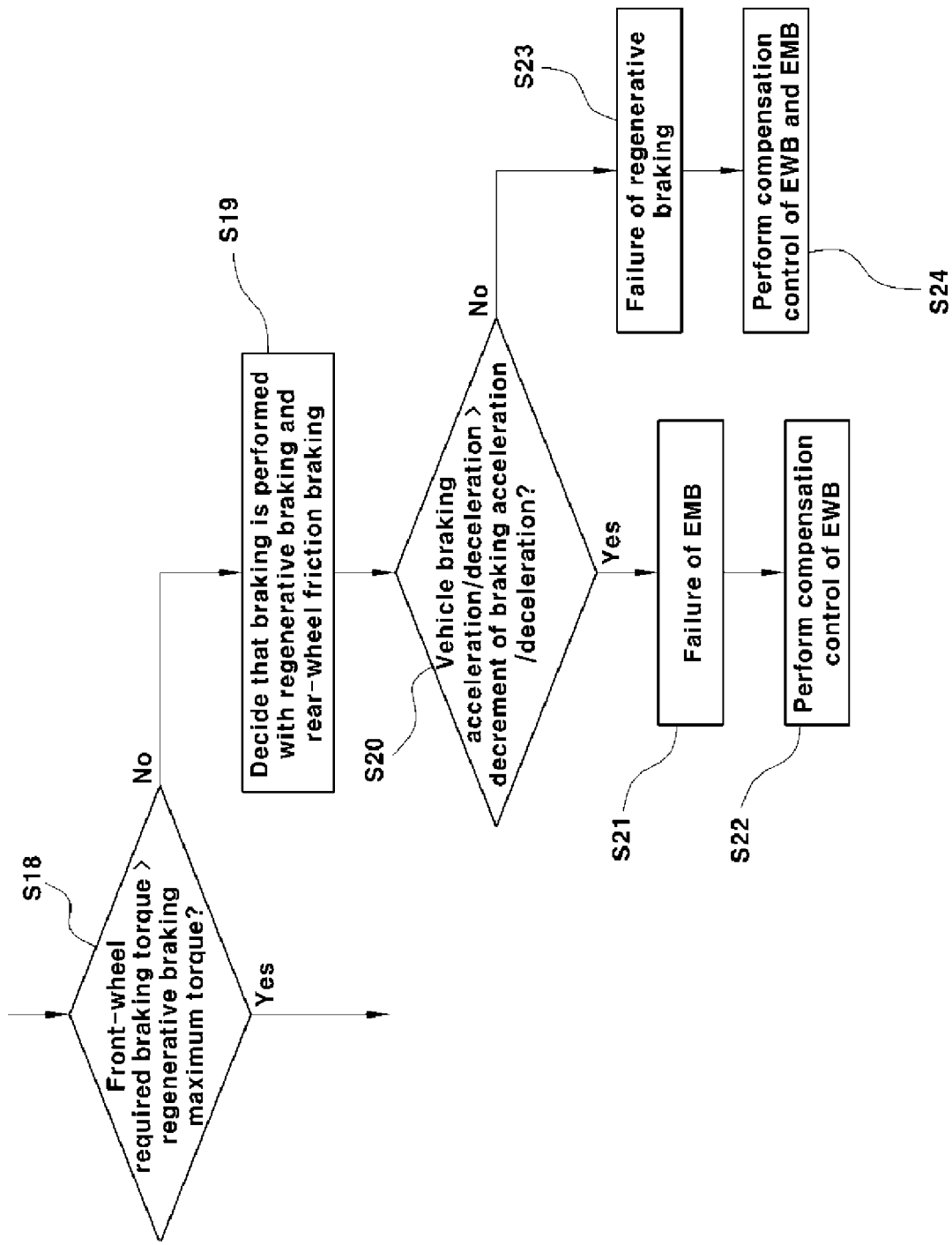
FIG. 5 is a partial flowchart showing 'C' of FIG. 1.

In a case where the driver's required braking torque is no less than the regenerative braking maximum torque, the BCU compares a front-wheel required braking torque with the regenerative braking maximum torque as shown in FIG. 5 (S18).

The front-wheel required braking torque refers to a braking torque required in front wheels of the vehicle. The front-wheel required braking torque may be represented by the sum of a front-wheel regenerative braking torque and a front-wheel friction braking torque.

Figure 6:
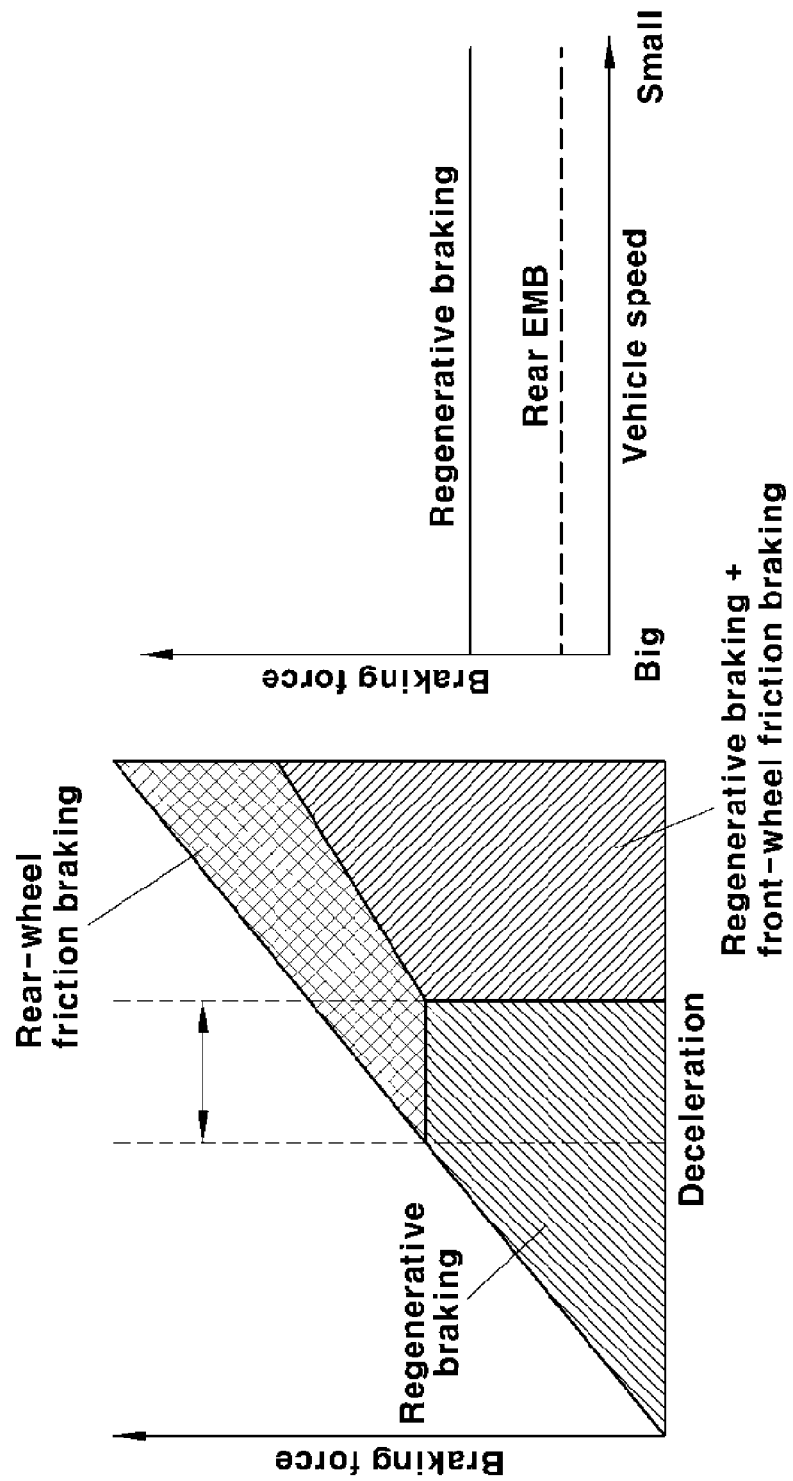
FIG. 6 shows in the left graph a combination of various braking forces constituting the vehicle braking force in regenerative braking cooperation control according to deceleration, and in the right graph a braking force generated by regenerative braking and a braking force generated by rear-wheel friction braking when braking is performed with only the regenerative braking and rear-wheel friction braking according to vehicle speed.

In a case where the driver's required braking torque is no less than the regenerative braking maximum torque, the BCU decides that the braking of the vehicle is performed with the cooperation of the regenerative braking and the friction braking. In this case, if the front-wheel required braking torque is less than the regenerative braking maximum torque, the BCU decides that the braking of the vehicle is not performed with the front-wheel friction braking but performed with the cooperation of only the regenerative braking and the rear-wheel friction braking as shown in FIG. 6 (S19).

Since the front-wheel braking force is always greater than the rear-wheel braking force as known in the art, the BCU compares vehicle braking acceleration/deceleration with a decrement of braking acceleration/deceleration (S20). If the vehicle braking acceleration/deceleration is no less than the decrement of the braking acceleration/deceleration, the BCU decides that the failure has occurred in the rear-wheel friction braking device (EMB) (S21), and compensates for a deficient braking force, using the front-wheel friction braking device (EWB) (S22).

On the contrary, if the vehicle braking acceleration/deceleration is less than the decrement of braking acceleration/deceleration, the BCU decides that the failure has occurred in the regenerative braking device (S23), and compensates for a deficient braking force, using the front-wheel friction braking device and the rear-wheel friction braking device (S24).

The vehicle braking acceleration/deceleration refers to an acceleration/deceleration value generated by the braking of the vehicle, and the decrement of braking acceleration/deceleration refers to a decrement of the acceleration/deceleration value generated by the braking of the vehicle. The vehicle braking acceleration/deceleration may be obtained as a real-time measurement value of the acceleration/deceleration sensor.

Figure 7:
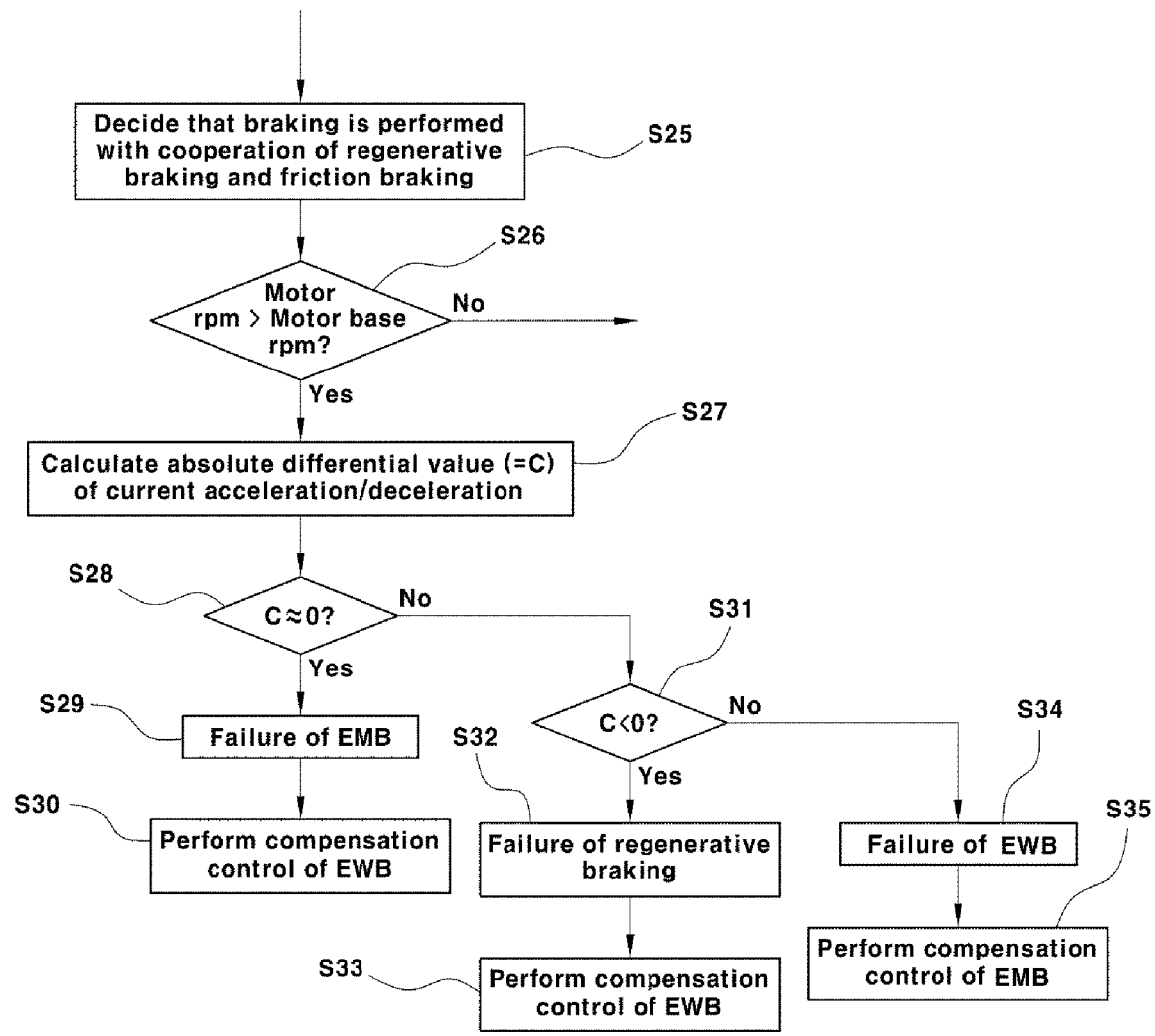
FIG. 7 is a partial flowchart showing 'D' of FIG. 1.

If the front-wheel required braking torque is no less than the regenerative braking maximum torque, the braking of the vehicle is performed using the front-wheel friction braking. Thus, as shown in FIGS. 7 and 8, the BCU decides that the braking of the vehicle is performed with the cooperation of the regenerative braking, the front-wheel friction braking and the rear-wheel friction braking (S25).

In a case where the braking of the vehicle is performed with the cooperation of the regenerative braking, the front-wheel friction braking and the rear-wheel friction braking as described above, the BCU compares a rotational speed (rpm) of the driving motor with a base speed (base rpm) of the driving motor (S26). In a case where the rotational speed of the driving motor is no less than the base speed, the BCU calculates an acceleration/deceleration differential value C by differentiating the absolute value of the current acceleration/deceleration of the vehicle, in consideration of the characteristic curve of the driving motor (S27). Here, the base speed of the driving motor is a rotational speed at which the driving motor starts generating the maximum torque.

In a case where the acceleration/deceleration differential value C is '0' or a value approximate to '0' by being compared with '0' (S28), the BCU decides that the failure has occurred in the rear-wheel friction braking device (EMB) (S29), and compensates for the deficient braking force, using the front-wheel friction braking device (EWB) (S30).

Figure 8:
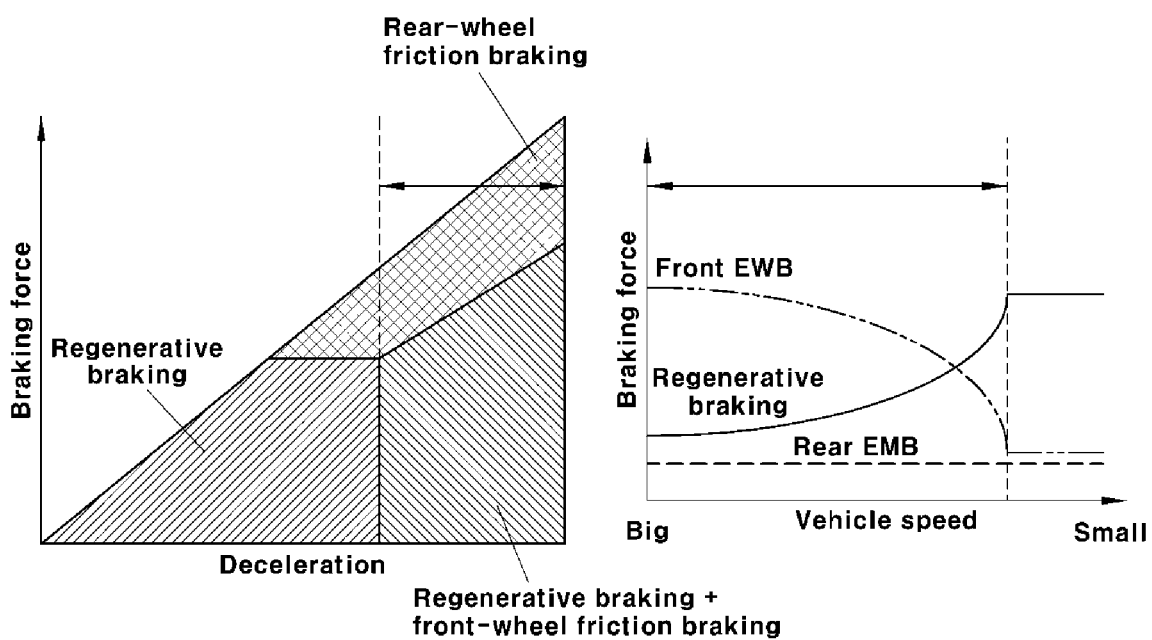
FIG. 8 shows in the left graph a combination of various braking forces constituting the vehicle braking force in regenerative braking cooperation control according to deceleration, and in the right graph shows a braking force generated by regenerative braking, a braking force generated by front-wheel friction braking and a braking force generated by rear-wheel friction braking when the regenerative braking and the friction braking are cooperatively performed according to vehicle speed.
Figure 9:
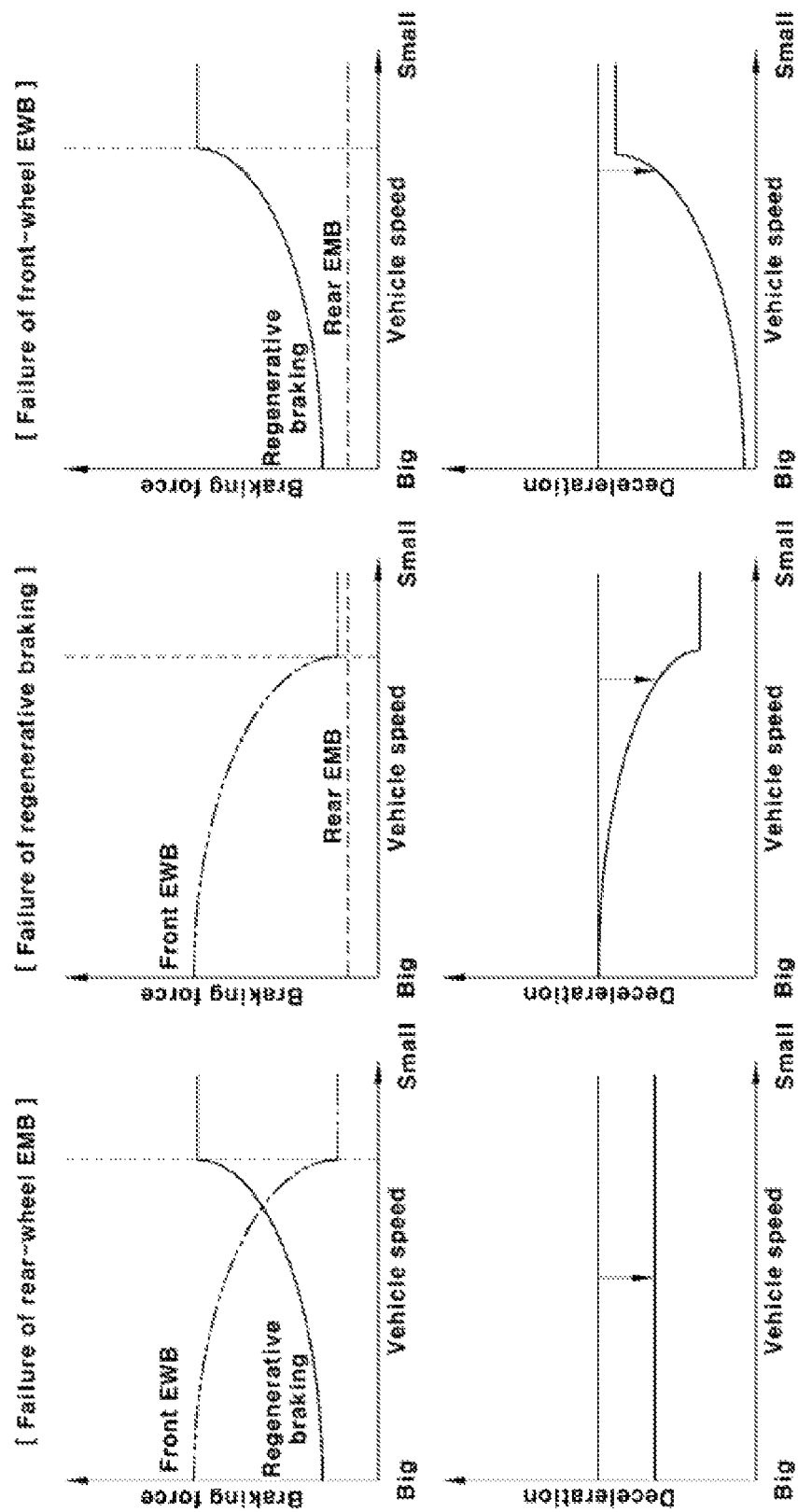
FIG. 9 shows changes in deceleration in a failure of a rear-wheel friction braking device, in a failure of a regenerative braking device and in a failure of a front-wheel friction braking device when the regenerative braking and the friction braking are cooperatively performed according to vehicle speed.

Although the speed of the vehicle is decreased, the rear-wheel friction braking device performs braking with a constant braking force as shown in FIG. 8. Thus, when the failure occurs in the rear-wheel friction braking device, the acceleration/deceleration of the vehicle is decreased by a predetermined value, regardless of the speed of the vehicle, as shown in FIG. 9, and the acceleration/deceleration differential value C becomes '0' or a value approximate to '0'. Accordingly, when the acceleration/deceleration differential value C is '0' or a value approximate to '0', the BCU can decide that the failure occurred in the rear-wheel friction braking device.

In a case where the acceleration/deceleration differential value C is smaller than '0' by being compared with '0' (S31), the BCU decides that the failure has occurred in the regenerative braking device (S32), and compensates for the deficient braking force, using the front-wheel friction braking device (S33). In a case where the acceleration/deceleration differential value C is greater than '0', the BCU decides that the failure has occurred in the front-wheel friction braking device (S34), and compensates for the deficient braking force, using the rear-wheel friction braking device (S35).

As the speed of the vehicle is decreased, the regenerative braking force is increased as shown in FIG. 8. Hence, the acceleration/deceleration of the vehicle is decreased when the failure occurs in the regenerative braking device. In this case, as the speed of the vehicle is decreased as shown in FIG. 9, the regenerative braking force is gradually decreased in a wide range, and the acceleration/deceleration differential value C becomes a value smaller than '0'. Accordingly, when the acceleration/deceleration differential value C is smaller than '0', the BCU can decide that the failure has occurred in the regenerative braking device.

As the speed of the vehicle is decreased, the front-wheel friction braking force is decreased as shown in FIG. 8. Hence, the acceleration/deceleration of the vehicle is decreased when the failure occurs in the front-wheel friction braking device. In this case, as the speed of the vehicle is decreased as shown in FIG. 9, the front-wheel friction braking force is gradually decreased in a wide range, and the acceleration/deceleration differential value C becomes a value greater than '0'. Accordingly, when the acceleration/deceleration differential value C is greater than '0', the BCU can decide that the failure has occurred in the front-wheel friction braking device.

In a case where it is decided that the failure has occurred in the rear-wheel friction braking device as shown in the left graph of FIG. 9, the braking of the vehicle is performed with the cooperation of only the regenerative braking device and the front-wheel friction braking device. Thus, the braking force is not generated by the rear-wheel friction braking device, so that the deceleration value of the vehicle is decreased. In this case, the deceleration value of the vehicle is constantly decreased while drawing a straight line, regardless of the speed of the vehicle.

In a case where it is decided that the failure has occurred in the regenerative braking device as shown in the middle graph of FIG. 9, the braking of the vehicle is performed using only the front-wheel friction braking device and the rear-wheel friction braking device. Thus, the braking force is not generated by the regenerative braking device, so that the deceleration value of the vehicle is decreased. In this case, the deceleration value of the vehicle is decreased while drawing a downward curve as the speed of the vehicle is decreased.

In a case where it is decided that the failure has occurred in the front-wheel friction braking device as shown in the right graph of FIG. 9, the braking of the vehicle is performed using only the regenerative braking device and the rear-wheel friction braking device. Thus, the braking force is not generated by the front-wheel friction braking device, so that the deceleration value of the vehicle is decreased. In this case, the deceleration value of the vehicle is decreased while drawing an upward curve as the speed of the vehicle is decreased.

In a case where the rotational speed of the driving motor is less than the base speed (base rpm), and the braking of the vehicle is performed with the cooperation of the regenerative braking, the front-wheel friction braking and the rear-wheel friction braking, the BCU decides whether the failure occurs in the brake system by comparing the decreased acceleration/deceleration value of the vehicle (or the decrement of the acceleration/deceleration of the vehicle) with the acceleration/deceleration value generated by only the regenerative braking (S36).

Figure 11:
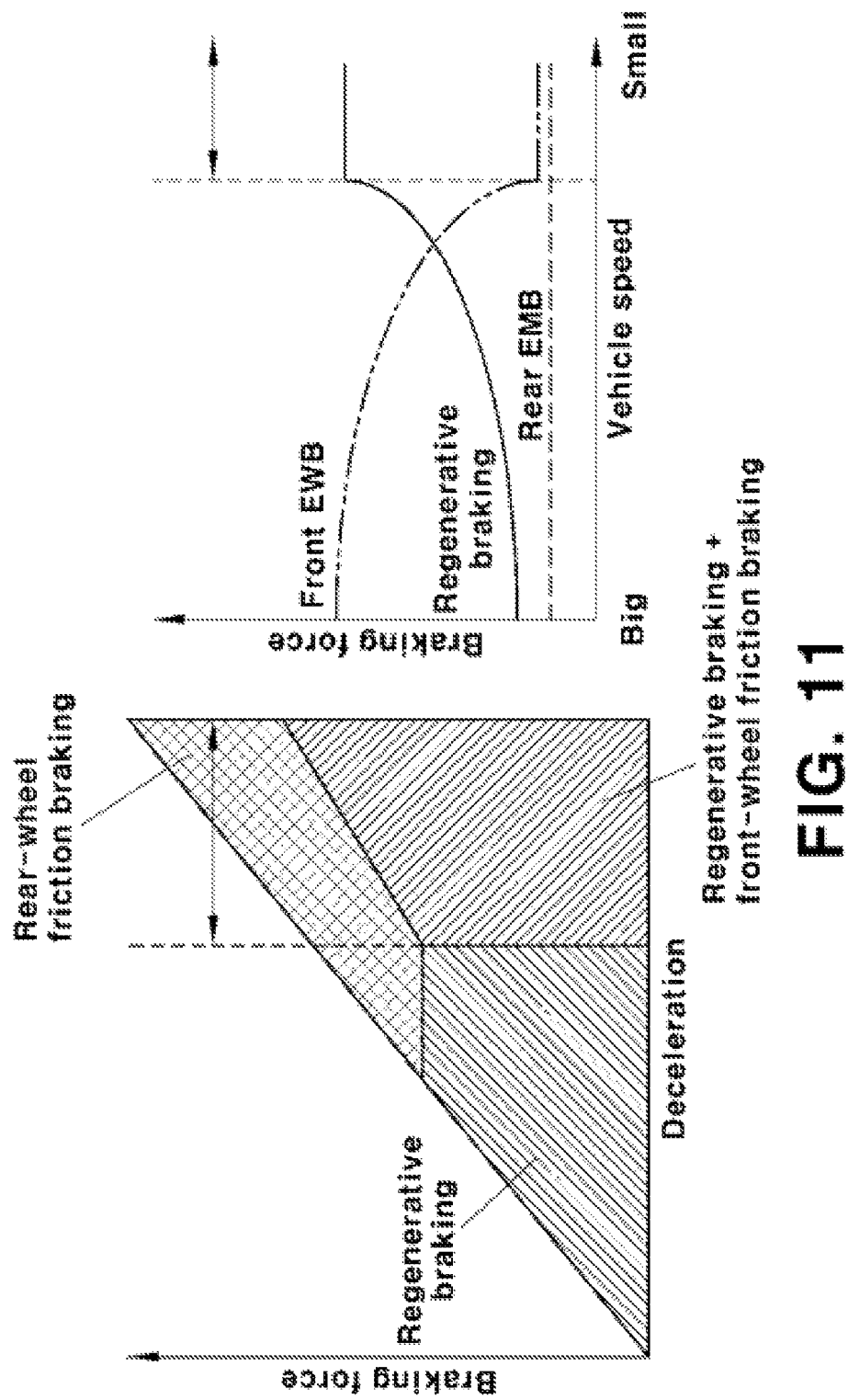
FIG. 11 shows in the left graph a combination of various braking forces constituting the vehicle braking force in regenerative braking cooperation control according to deceleration, and in the right graph a braking force generated by regenerative braking, a braking force generated by front-wheel friction braking and a braking force generated by rear-wheel friction braking when the regenerative braking and the friction braking are cooperatively performed according to vehicle speed.

If the brake system is normal when the rotational speed of the driving motor is less than the base speed (base rpm), and the braking of the vehicle is performed with the cooperation of the regenerative braking, the front-wheel friction braking and the rear-wheel friction braking as shown in the left graph of FIG. 11, the braking force of the vehicle is generated as shown in the right graph of FIG. 11. However, if a failure occurs in any one of the braking devices, the braking force of the vehicle is decreased by the braking force of the braking device in which the failure occurs, so that the acceleration/deceleration value of the vehicle is decreased.

In a case where the decreased acceleration/deceleration value of the vehicle is equal to the acceleration/deceleration value generated by only the regenerative braking, the BCU decides that the failure has occurred in the regenerative braking device or the front-wheel friction braking device (S37). In a case where the decreased acceleration/deceleration value of the vehicle is different from the acceleration/deceleration value generated by only the regenerative braking, the BCU decides that the failure has occurred in the front-wheel friction braking device or the rear-wheel friction braking device (S38).

In a case where it is decided that the failure has occurred in the friction braking device, a change in acceleration/deceleration of the vehicle is confirmed by individually changing braking forces of the front-wheel friction braking device and the rear-wheel friction braking device, so that it is possible to decide the braking device in which the failure occurs (S39).

In other words, it is confirmed whether the change in acceleration/deceleration of the vehicle occurs by changing the braking force of only the front-wheel friction braking device, and it is confirmed whether the change in acceleration/deceleration of the vehicle occurs by changing the braking force of only the rear-wheel friction braking device, so that it is possible to decide the braking device in which the failure occurs.

That is, in a case where the acceleration/deceleration of the vehicle is not changed even though the braking force of the front-wheel friction braking device or the rear-wheel friction braking device, it can be decided that the failure has occurred in the braking device, of which braking force is changed.

Figure 10:
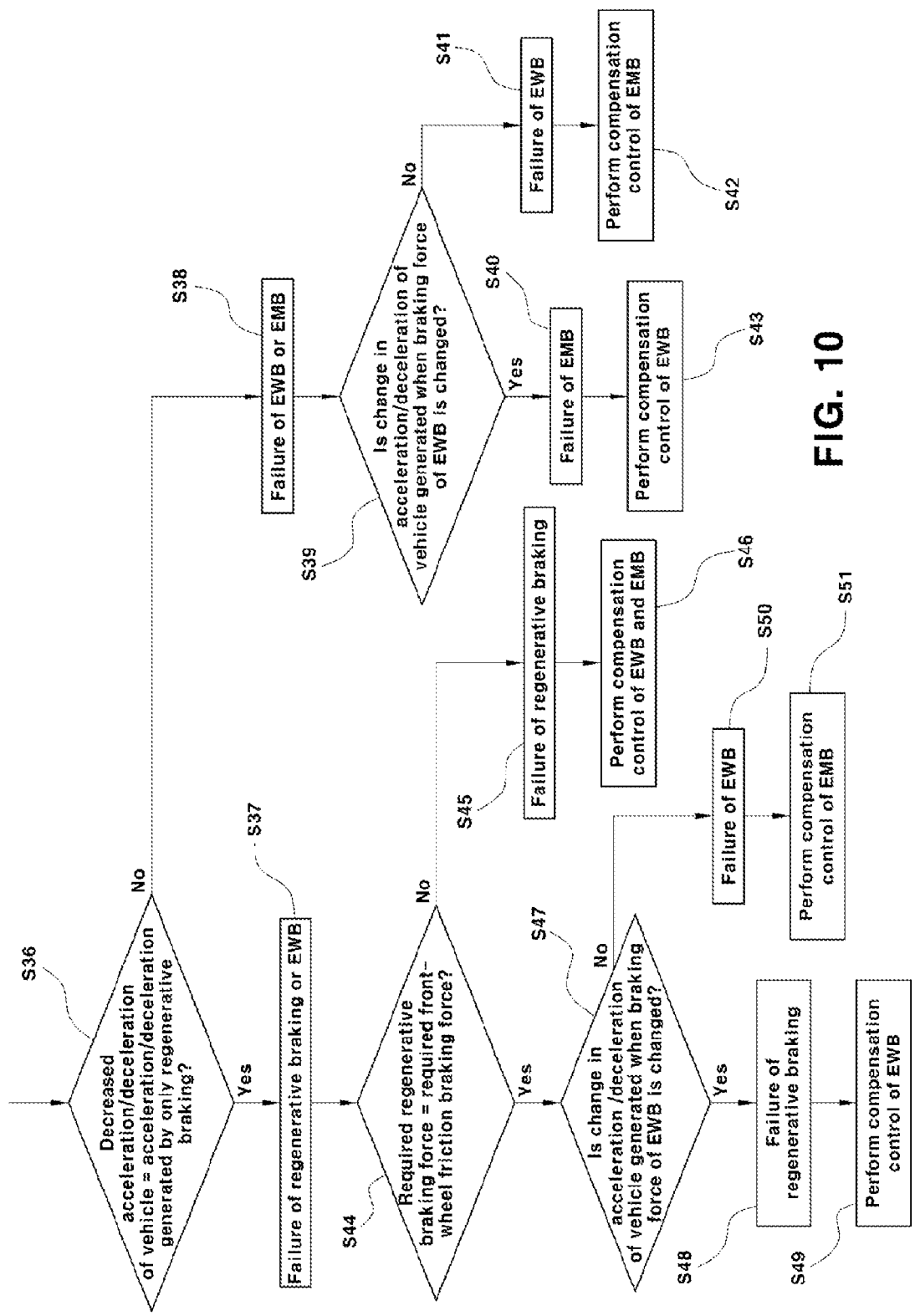
FIG. 10 is a partial flowchart showing 'E' of FIG. 1.

Thus, as shown in FIG. 10, the BCU decides whether a change in acceleration/deceleration of the vehicle occurs when the braking force of the front-wheel friction braking device is changed (S39). When a change in acceleration/deceleration of the vehicle occurs, the BCU decides that the failure has occurred in the rear-wheel friction braking device (S40). When a change in acceleration/deceleration of the vehicle does not occur, the BCU decides that the failure has occurred in the front-wheel friction braking device (S41).

In a case where it is decided that the failure has occurred in the front-wheel friction braking device, the BCU compensates for the deficient braking force, using the rear-wheel friction braking device in which the failure does not occur (S42). In a case where it is decided that the failure has occurred in the rear-wheel friction braking device, the BCU compensates for the deficient braking force, using the front-wheel friction braking device in which the failure does not occur (S43).

Meanwhile, in a case it is decided that the failure has occurred in the regenerative braking device or the front-wheel friction braking device, the BCU compares a required regenerative braking force with a required front-wheel friction braking force (S44).

The required regenerative braking force refers to a braking force required in the regenerative braking device when the braking of the vehicle is performed, and the required front-wheel friction braking force refers to a braking force required in the front-wheel friction braking device when the braking of the vehicle is performed.

In a case where the required regenerative braking force is different from the required front-wheel friction braking force, the BCU decides that the failure has occurred in the regenerative braking device (S45), and compensates for the deficient braking force, using the front-wheel friction braking device and the rear-wheel friction braking device (S46).

On the contrary, in a case where the required regenerative braking force is equal to the required front-wheel friction braking force, the BCU decides whether a change in acceleration/deceleration value of the vehicle is generated when the braking force of the front-wheel friction braking device is changed (S47).

If a change in acceleration/deceleration value of the vehicle is generated when the braking force of the front-wheel friction braking device is changed, i.e., if the change in braking force of the front-wheel friction braking device has influence on the acceleration/deceleration value of the vehicle, the BCU decides that the failure has occurred in the regenerative braking device (S48), and compensates for the deficient braking force, using the front-wheel friction braking device (S49).

If a change in acceleration/deceleration value of the vehicle is not generated when the braking force of the front-wheel friction braking device is changed, i.e., if the change in braking force of the front-wheel friction braking device has no influence on the acceleration/deceleration value of the vehicle, the BCU decides that the failure has occurred in the front-wheel friction braking device (S50), and compensates for the deficient braking force, using the rear-wheel friction braking device (S51).

As described above, in the failure diagnosis method for the brake system according to the present invention, it is decided whether a failure occurs in any one of the braking devices by analyzing a change in acceleration/deceleration value detected through the acceleration/deceleration sensor built in the vehicle when a failure decision signal of the brake system is not used, so that it is possible to generate a braking force corresponding to a driver's required braking force by compensating for a deficient braking force, using normal braking devices.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A failure diagnosis method for a brake system of a vehicle, comprising:
   comparing by a controller, a driver's required deceleration with a current deceleration of the vehicle;
   determining by the controller that a failure has occurred in the brake system of the vehicle when the driver's required deceleration is different from the current deceleration of the vehicle;
   comparing by the controller a driver's required braking torque with a regenerative braking maximum torque when the failure is determined to have occurred,
   wherein, when the driver's required braking torque is less than the regenerative braking maximum torque, it is determined by the controller that a braking of the vehicle is performed with only a regenerative braking and the failure has occurred in a regenerative braking device of the brake system;
   comparing a front-wheel required braking torque with the regenerative braking maximum torque, when the driver's required braking torque is greater than or equal to the regenerative braking maximum torque;
   comparing vehicle braking deceleration with a decrement of braking deceleration, when the front-wheel required braking torque is less than the regenerative braking maximum torque; and
   determining that the failure has occurred in a rear-wheel friction braking device, when the vehicle braking deceleration is greater than or equal to the decrement of the braking deceleration, and determining that the failure has occurred in the regenerative braking device, when the vehicle deceleration is less than the decrement of the braking deceleration.

2. A failure diagnosis method for a brake system of a vehicle, comprising:
   comparing by a controller, a driver's required deceleration with a current deceleration of the vehicle;
   determining by the controller that a failure has occurred in the brake system of the vehicle when the driver's required deceleration is different from the current deceleration of the vehicle;
   comparing by the controller a driver's required braking torque with a regenerative braking maximum torque when the failure is determined to have occurred,
   wherein, when the driver's required braking torque is less than the regenerative braking maximum torque, it is determined by the controller that a braking of the vehicle is performed with only a regenerative braking and the failure has occurred in a regenerative braking device of the brake system;
   comparing a front-wheel braking torque with the regenerative braking maximum torque, when the driver's required braking torque is greater than or equal to the regenerative braking maximum torque;
   comparing a motor rotational speed with a motor base speed, when the front-wheel required braking torque is greater than or equal to the regenerative braking maximum torque;
   calculating a deceleration differential value by differentiating an absolute value of the current deceleration of the vehicle, when the motor rotational speed is greater than or equal to the motor base speed; and
   determining whether the failure occurs in the regenerative braking device, a front-wheel friction braking device or a rear-wheel friction braking device,
      wherein, when the deceleration differential value is substantially equal to 0, it is decided that the failure has occurred in the rear-wheel friction braking device,
      wherein, when the deceleration differential value is smaller than 0, it is decided that the failure has occurred in the regenerative braking device, and
      wherein, when the deceleration differential value is greater than 0, it is decided that the failure has occurred in the front-wheel friction braking device.

3. A failure diagnosis method for a brake system of a vehicle, comprising:
   comparing by a controller, a driver's required deceleration with a current deceleration of the vehicle;
   determining by the controller that a failure has occurred in the brake system of the vehicle when the driver's required deceleration is different from the current deceleration of the vehicle;
   comparing by the controller a driver's required braking torque with a regenerative braking maximum torque when the failure is determined to have occurred,
   wherein, when the driver's required braking torque is less than the regenerative braking maximum torque, it is determined by the controller that a braking of the vehicle is performed with only a regenerative braking and the failure has occurred in a regenerative braking device of the brake system;
   comparing a front-wheel required braking torque with the regenerative braking maximum torque, when the driver's required braking torque is greater than or equal to the regenerative braking maximum torque;
   comparing a motor rotational speed with a motor base speed, when the front-wheel required braking torque is greater than or equal to the regenerative braking maximum torque; and
   determining whether the failure occurs in the regenerative braking device, a front-wheel friction braking device or a rear-wheel friction braking device, based on a result obtained by comparing decreased deceleration of the vehicle with deceleration generated only by the regenerative braking, when the motor rotational speed is less than the motor base speed.

4. The failure diagnosis method of claim 3, further comprising:
   comparing a required regenerative braking force with a required front-wheel friction braking force, when the decreased deceleration of the vehicle is substantially equal to the deceleration generated only by the regenerative braking; and determining that the failure has occurred in the regenerative braking device, when the required regenerative braking force is different from the required front-wheel friction braking force.

5. The failure diagnosis method of claim 3, further comprising:
   comparing a required regenerative braking force with a required front-wheel friction braking force, when the decreased deceleration of the vehicle is substantially equal to the deceleration generated only by the regenerative braking;
   determining whether a change in deceleration of the vehicle is generated in response to a change in braking force of the front-wheel friction braking device, when the required regenerative braking force is substantially equal to the required front-wheel friction braking force; and
   determining that the failure has occurred in the regenerative braking device, when the change in the deceleration of the vehicle is generated, and determining that the failure has occurred in the front-wheel friction braking device, when the change in the deceleration of the vehicle is not generated.

6. The failure diagnosis method of claim 3, further comprising:
   determining whether a change in deceleration of the vehicle is generated in response to a change in braking force of the front-wheel friction braking device, when the decreased deceleration of the vehicle is different from the deceleration generated only by the regenerative braking; and
   determining that the failure has occurred in the rear-wheel friction braking device, when a change in deceleration of the vehicle is generated, and determining that the failure has occurred in the front-wheel friction braking device, when the change in the deceleration of the vehicle is not generated.

* * * * *